US007987172B1

(12) United States Patent
Carver

(10) Patent No.: US 7,987,172 B1
(45) Date of Patent: Jul. 26, 2011

(54) MINIMIZING VISIBILITY OF STALE CONTENT IN WEB SEARCHING INCLUDING REVISING WEB CRAWL INTERVALS OF DOCUMENTS

(75) Inventor: Anton P. T. Carver, Mountain View, CA (US)

(73) Assignee: Google Inc., Mountain View, CA (US)

( * ) Notice: Subject to any disclaimer, the term of this patent is extended or adjusted under 35 U.S.C. 154(b) by 533 days.

(21) Appl. No.: 10/930,280

(22) Filed: Aug. 30, 2004

(51) Int. Cl.
*G06F 7/00* (2006.01)
*G06F 17/30* (2006.01)

(52) U.S. Cl. ........................ 707/709; 707/706
(58) Field of Classification Search ........... 707/3, 104.1, 707/10, 709
See application file for complete search history.

(56) References Cited

U.S. PATENT DOCUMENTS

| | | | | |
|---|---|---|---|---|
| 4,312,009 | A | 1/1982 | Lange | 346/140 |
| 5,521,140 | A | 5/1996 | Matsuda et al. | 503/227 |
| 5,594,480 | A | 1/1997 | Sato et al. | 347/51 |
| 5,634,062 | A | 5/1997 | Shimizu et al. | 395/762 |
| 5,801,702 | A | 9/1998 | Dolan et al. | 345/357 |
| 5,832,494 | A | 11/1998 | Egger et al. | 707/102 |
| 5,898,836 | A | 4/1999 | Freivald et al. | 395/200.48 |
| 6,003,060 | A | 12/1999 | Aznar et al. | 709/103 |
| 6,012,087 | A | 1/2000 | Freivald et al. | 709/218 |
| 6,049,804 | A * | 4/2000 | Burgess et al. | 707/100 |
| 6,068,363 | A | 5/2000 | Saito | 347/17 |
| 6,189,019 | B1 | 2/2001 | Blumer et al. | 707/513 |
| 6,219,818 | B1 | 4/2001 | Freivald et al. | 714/799 |
| 6,243,091 | B1 | 6/2001 | Berstis | 345/349 |
| 6,263,350 | B1 | 7/2001 | Wollrath et al. | 707/206 |
| 6,263,364 | B1 | 7/2001 | Najork et al. | 709/217 |
| 6,269,370 | B1 * | 7/2001 | Kirsch | 707/10 |
| 6,285,999 | B1 | 9/2001 | Page | |
| 6,321,265 | B1 | 11/2001 | Najork et al. | 709/224 |
| 6,336,123 | B2 | 1/2002 | Inoue et al. | 707/501.1 |
| 6,351,755 | B1 | 2/2002 | Najork et al. | 707/501.1 |
| 6,377,984 | B1 | 4/2002 | Najork et al. | 709/217 |
| 6,404,446 | B1 | 6/2002 | Bates et al. | 345/854 |

(Continued)

FOREIGN PATENT DOCUMENTS

WO WO 01/50320 A1 7/2001

(Continued)

OTHER PUBLICATIONS

Cho et al. "Effective Page Refresh Policies for Web Crawlers." ACM Transactions on Database Systems, vol. 28, No. 4, Dec. 2003, pp. 390-426.*

(Continued)

*Primary Examiner* — Charles E Lu
(74) *Attorney, Agent, or Firm* — Morgan, Lewis & Bockius LLP

(57) ABSTRACT

A method and system is disclosed for associating an appropriate web crawl interval with a document so that the probability of the document's stale content being used by a search engine is below an acceptable level when the search engine crawls the document at its associated web crawl interval. The web crawl interval of a document is determined through an iterative process and updated dynamically by the search engine after every visit to the document by a web crawler. A multi-tier data structure is employed for managing the web crawl order of billions of documents on the Internet. The search engine may move a document from one tier to another if its web crawl interval is changed significantly.

48 Claims, 4 Drawing Sheets

U.S. PATENT DOCUMENTS

| | | | |
|---|---|---|---|
| 6,418,433 B1 | 7/2002 | Chakrabarti et al. | 707/5 |
| 6,418,453 B1 | 7/2002 | Kraft et al. | 707/200 |
| 6,424,966 B1 | 7/2002 | Meyerzon et al. | 707/3 |
| 6,547,829 B1 | 4/2003 | Meyerzon et al. | 715/501.1 |
| 6,594,662 B1 | 7/2003 | Sieffert et al. | 707/10 |
| 6,631,369 B1 | 10/2003 | Meyerzon et al. | 707/4 |
| 6,638,314 B1 | 10/2003 | Meyerzon et al. | 715/513 |
| 6,701,350 B1 | 3/2004 | Mitchell | 709/217 |
| 6,751,612 B1 | 6/2004 | Schuetze et al. | 707/4 |
| 6,763,362 B2 | 7/2004 | McKeeth | 707/104.1 |
| 6,772,203 B1 | 8/2004 | Feiertag et al. | 709/219 |
| 6,950,874 B2 | 9/2005 | Chang et al. | 709/229 |
| 6,952,730 B1 | 10/2005 | Najork et al. | 709/225 |
| 7,047,491 B2 | 5/2006 | Schubert et al. | 715/530 |
| 7,080,073 B1 | 7/2006 | Jiang et al. | 707/7 |
| 7,139,747 B1 | 11/2006 | Najork | 707/3 |
| 7,171,619 B1 | 1/2007 | Bianco | 715/526 |
| 7,200,592 B2 | 4/2007 | Goodwin et al. | 707/6 |
| 7,231,606 B2 | 6/2007 | Miller et al. | 715/738 |
| 7,260,543 B1 | 8/2007 | Saulpaugh et al. | 705/1 |
| 7,299,219 B2 | 11/2007 | Green et al. | 707/2 |
| 7,308,643 B1 | 12/2007 | Zhu et al. | 715/501.1 |
| 7,310,632 B2 | 12/2007 | Meek et al. | 707/3 |
| 7,346,839 B2 | 3/2008 | Acharya et al. | 715/500 |
| 7,725,452 B1 | 5/2010 | Randall | 707/709 |
| 2002/0010682 A1 | 1/2002 | Johnson | 705/59 |
| 2002/0052928 A1 | 5/2002 | Stern et al. | 709/218 |
| 2002/0065827 A1 | 5/2002 | Christie et al. | 707/10 |
| 2002/0073188 A1 | 6/2002 | Rawson, III | 709/223 |
| 2002/0099602 A1 | 7/2002 | Moskowitz et al. | 705/14 |
| 2002/0129062 A1 | 9/2002 | Luparello | 707/513 |
| 2003/0061260 A1 | 3/2003 | Rajkumar | 709/104 |
| 2003/0158839 A1 | 8/2003 | Faybishenko et al. | 707/3 |
| 2004/0044962 A1 | 3/2004 | Green et al. | 715/513 |
| 2004/0064442 A1* | 4/2004 | Popovitch | 707/3 |
| 2004/0128285 A1* | 7/2004 | Green et al. | 707/3 |
| 2004/0225642 A1 | 11/2004 | Squillante et al. | 707/3 |
| 2004/0225644 A1 | 11/2004 | Squillante et al. | 707/3 |
| 2005/0071766 A1 | 3/2005 | Brill et al. | 715/738 |
| 2005/0086206 A1 | 4/2005 | Balasubramanian et al. | 707/3 |
| 2006/0036605 A1* | 2/2006 | Powell et al. | 707/10 |
| 2006/0069663 A1 | 3/2006 | Adar et al. | 707/1 |
| 2006/0277175 A1 | 12/2006 | Jiang et al. | 707/5 |

FOREIGN PATENT DOCUMENTS

WO      WO 01/86507 A1    11/2001

OTHER PUBLICATIONS

Cho et al. "Estimating Frequency of Change." ACM Transactions on Internet Technology, 3(3): Aug. 2003. 32 pages.*
Brin, S., et al., "The Anatomy of a Large-Scale Hypertextual Search Engine," Proceedings of ther 7th Int'l World Wide Web Conference, Brisbane, Australia, 1998.
Final Office Action issued in U.S. Appl. No. 10/853,627, on May 12, 2008.
Brandman, O., et al., "Crawler-Friendly Web Servers," ACM Sigmetrics Performance Evalu ation Review, vol. 28, Issue 2, Sep. 2000, pp. 9-14.
Cho, J., et al., "Efficient Crawling Through URL Ordering," Computer Networks and ISDN Systems, vol. 30, Issues 1-7, Apr. 1988, pp. 161-172.
Cho, J., "Crawling the Web: Discovery and Maintenance of Large-Scale Web Data," PhD Thesis, Dept. Of Computer Science, Stanford University, 2001, 188 pages.
Cho, J., et al., "The Evolution of the Web and Implications for an Incremental Crawler," Proc. of the 26th VLDB Conf., Cairo, Egypt, 2000, pp. 200-209.
Cho, J., et al., "Synchronizing a Database to Improve Freshness," MOD 2000, Dallas, Texas, Jun. 2000, pp. 117-128.
Coffman, Jr., E.G., et al., "Optimal Robot Scheduling," Tech. Rep. RR-3317, 1997, 19 pages.
Introna, L., et al., "Defining the Web: the Politics of Search Engines," Computer, vol. 33, Issue 1, Jan. 2000, pp. 54-62.
Klemm, R.P., "WebCompanion: A Friendly Client-Side Web Prefetching Agent," IEEE Transactions on Knowledge and Data Engineering, vol. 11, No. 4, Jul./Aug. 1999, pp. 577-594.
Lee, J.K.W., et al., "Intelligent Agents for Matching Information Providers and Consumers on the World-Wide Web," Proc. of the 13th Annual Hawaii Int'l Conf. on System Sciences, 1997, 11 pages.
Pendey, S., et al., "Monitoring the Dynamic Web to Respond to Continuous Queries," WWW 2003, Budapest, Hungry, May 20-24, 2003, pp. 659-668.
Ali, What's Changed? Measuring Document Change in Web Crawling for Search Engines, SPIRE 2003, LNCS 2857, 2003, pp. 28-42, Springer-Verlag, Berlin, Germany.
Arasu, Searching the Web, ACM Transactions on Internet Technology, ACM Transactions on Internet Technology, vol. 1, No. 1, Aug. 2001, pp. 2-43.
Baeza-Yates, Balancing Volume, Quality and Freshness in Web Crawling, Center for Web Research, Dept. of Computer Science, University of Chile, 2002, pp. 1-10.
Brusilovsky, Map-Based Horizontal Navigation in Education Hypertext, ACM Press, Jun. 2002, pp. 1-10.
Bullot, A Data-Mining Approach for Optimizing Performance of an Incremental Crawler, WI '03, Oct. 13-17, 2003, pp. 610-615.
Douglis, Rate of Change and Other Metrics: a Live Study of the World Wide Web, USENIX Symposium on Internetworking Technologies and Systems, Monterey, CA, Dec. 1997, pp. I and 1-14.
Douglis, The At&T Internet Difference Engine: Tracking and Viewing Changes on the Web, World Wide Web, vol. 1, No. 1, Mar. 1998, pp. 27-44.
Fetterly, A Large-Scale Study of the Evolution of Web Pages, WWW 2003, Budapest, Hungary, May 20-24, 2003, pp. 669-678.
Haveliwala, Topic-Sensitive PageRank, WWW2002, Honolulu, HI, May 7-11, 2002, 10 pages.
Henzinger, Web Information Retrieval—an Algorithmic Perspective, ESA 2000, LNCS 1879, 2000, pp. 1-8, Springer-Verlag, Berlin, Germany.
Heydon, Mercator: A Scalable, Extensible Web Crawler, World Wide Web, vol. 2, No. 4, Dec. 1999, pp. 219-229.
Hirai, WebBase: a Repository of Web Pages, Computer Networks, vol. 33, Jun. 2000, pp. 277-293.
Jeh, Scaling Personalized Web Search, WWW2003, Budapest, Hungary, May 20-24, 2003, pp. 271-279.
Kamvar, Exploiting the Block Structure of the Web for Computing PageRank, Stanford University Technical Report, 2003, 13 pages.
Najork, Breadth-First Search Crawling Yields High-Quality Pages, WWW10, May 1-5, 2001, pp. 114-118.
Shkapenyuk, Design and Implementation of a High-Performance Distributed Web Crawler, ICDE '02, San Jose, CA, Feb. 26-Mar. 1, 2002, pp. 357-368.
Suel, Odissea: A Peer-to-Peer Architecture for Scalable Web Search and Information Retrieval, WebDB, San Diego, CA, Jun. 12-13, 2003, pp. 1-6.
Wolf, Optimal Crawling Strategies for Web Search Engines, WWW 2002, Honolulu, Hawaii, May 7-11, 2002, pp. 136-147.
Office Action from related U.S. Appl. No. 11/394,619, dated Sep. 23, 2010, 23 pages.

* cited by examiner

MINIMIZING VISIBILITY OF STALE CONTENT IN WEB SEARCHING INCLUDING REVISING WEB CRAWL INTERVALS OF DOCUMENTS

FIELD OF THE INVENTION

The present invention relates generally to the field of search engines for locating documents in a computer network system, and in particular, to a system and method for minimizing the visibility of stale data through a web search engine.

BACKGROUND OF THE INVENTION

Search engines provide a powerful tool for locating documents in a large database of documents, such as the documents on the Internet or the documents stored on the computers of an Intranet. In the context of this application, a document is defined as a combination of a document address, e.g., a universal resource locator (URL), and a document content.

A typical structure of a web search engine comprises a front end and a back end. The front end includes a query server for receiving a search query submitted by a user and displaying search results to the user, and a query processor for transforming the search query into a search request understood by the back end of the web search engine. The back end includes one or more web crawlers for retrieving documents from the Internet, a scheduler for providing addresses of the documents to the web crawlers, an indexer for indexing the documents retrieved by the web crawlers and one or more databases for storing information of the retrieved documents, e.g., the indexes of the documents. Upon receipt of a search request, the front end searches the databases, identifies documents whose contents match the search request and returns them as the search results to the requester.

There are billions of documents accessible through the Internet. The life expectancy of a document's content (after which its contents may be replaced or changed) may vary from a few years, to a few seconds. Every day, many thousands of new and revised documents are posted by various web servers all over the world, while other documents are deleted from their hosting web servers and are therefore no longer accessible. As a result, at least some of the document information stored in a web search engine is likely to be stale, even if the web search engine is continuously crawling the web so as to update its database. Stale content in a search engine database is said to be visible when the search engine returns a result (e.g., in response to search query) that is based on stale information. In some cases, the stale content in the search engine may have no particular significance, because the changes to the documents listed in a search result are minor, or the relevance of the documents remains substantially the same. However, in other cases the search result may include links to documents that no longer exist, or whose content has changed such that the result is no longer relevant to the query (or has lower relevance to the query than the prior content of the documents). For purposes of this document, stale content is assumed to be visible, whenever search results are returned based on the stale content, even if the search results are still useful to the user.

In general, it would be desirable to keep the document information in a search engine's databases as fresh as possible, while avoiding needless refreshing of content that is highly static. More generally, it would be desirable to schedule documents for downloading by a web crawler so as to minimize the visibility of stale document information in the databases of the search engine.

SUMMARY

A web crawling system associates an appropriate web crawl interval with a document so that the probability of the document's stale content being used by a search engine is maintained below an acceptable level. Assuming sufficient crawl bandwidth, the search engine crawls each document at its associated web crawl interval.

In some embodiments, the web crawl interval of a document is identified by an iterative process that starts with an initial estimate of the web crawl interval. The iterative process, after crawling a document multiple times at different time intervals and analyzing the content changes associated with the crawling results, converges to a time interval that is deemed most appropriate for this document. This time interval is associated with the document as its web crawl interval.

In one embodiment, documents are partitioned into multiple tiers, each tier including a plurality of documents sharing similar web crawl intervals. After each crawl, the search engine re-evaluates a document's web crawl interval and determines if the document should be moved from its current tier to another tier.

In another embodiment, changes to a document's content are divided into two categories, critical content changes referring to those changes that occur to a predetermined portion of a document and non-critical content changes covering all other changes to the document. During the course of updating a document's web crawl interval, the search engine takes into account only critical content changes and ignores all non-critical content changes to the document.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF EMBODIMENTS

Figure 1:
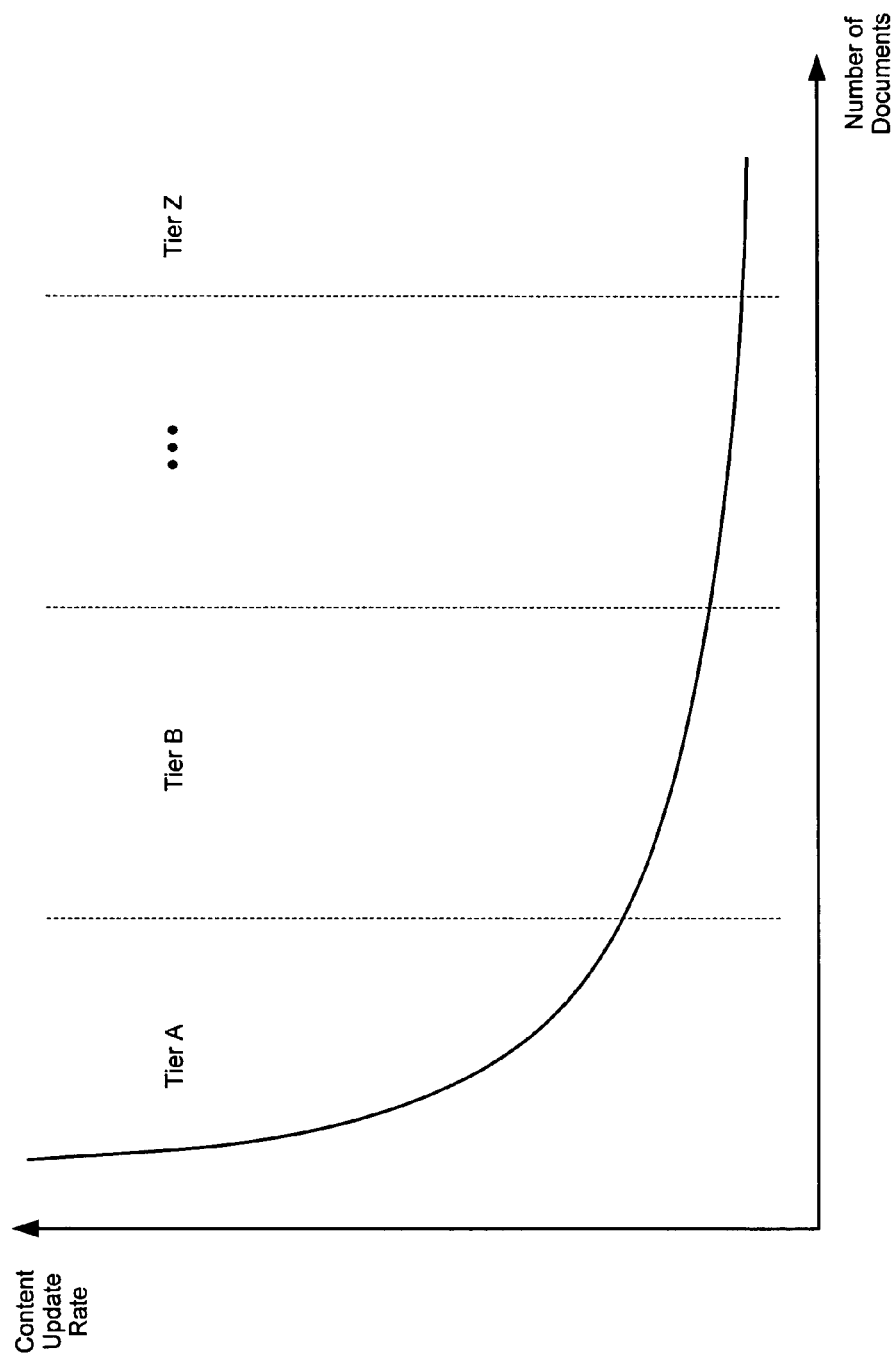
FIG. 1 schematically represents the distribution of the content update rates of documents on the Internet as an L-shaped curve.

It is expected that a small number of documents on the Internet will have content that changes frequently and a larger number of documents will have content that changes rather infrequently. Document update intervals may range, for example, from once every few seconds to once every few years. FIG. 1 schematically illustrates this as an L-shaped distribution of content update rates for documents. There are a relatively small number of documents having high content update rates, as shown at the left portion of the L-shaped curve. On the other hand, as shown at the right portion of the curve, there are a large number of documents with much lower content update rates. Based on the distribution of content update rates, a search engine may incorporate a multi-tier data structure to group a certain number of documents whose content update rates fall within a particular portion of the L-shaped curve. This grouping may be used to ease the administrative overhead of scheduling efforts to obtain new copies of the documents. On the other hand, in another embodiment, such a tier data structure is not used and documents are not grouped into tiers for crawling purposes. The concepts described below would apply whether or not a tiered structure was used.

As mentioned above, a tiered structure may allow groups of documents to be treated together for various administrative and processing purposes. As shown in FIG. 1, "Tier A" includes documents having the highest content update rates and "Tier Z" includes documents having the lowest content update rates. Typically, a document from a higher tier, e.g., Tier A, is given a higher crawling priority, or a higher crawl repetition rate, than any document from a lower tier, e.g., Tier B, and vice versa.

Figure 2:
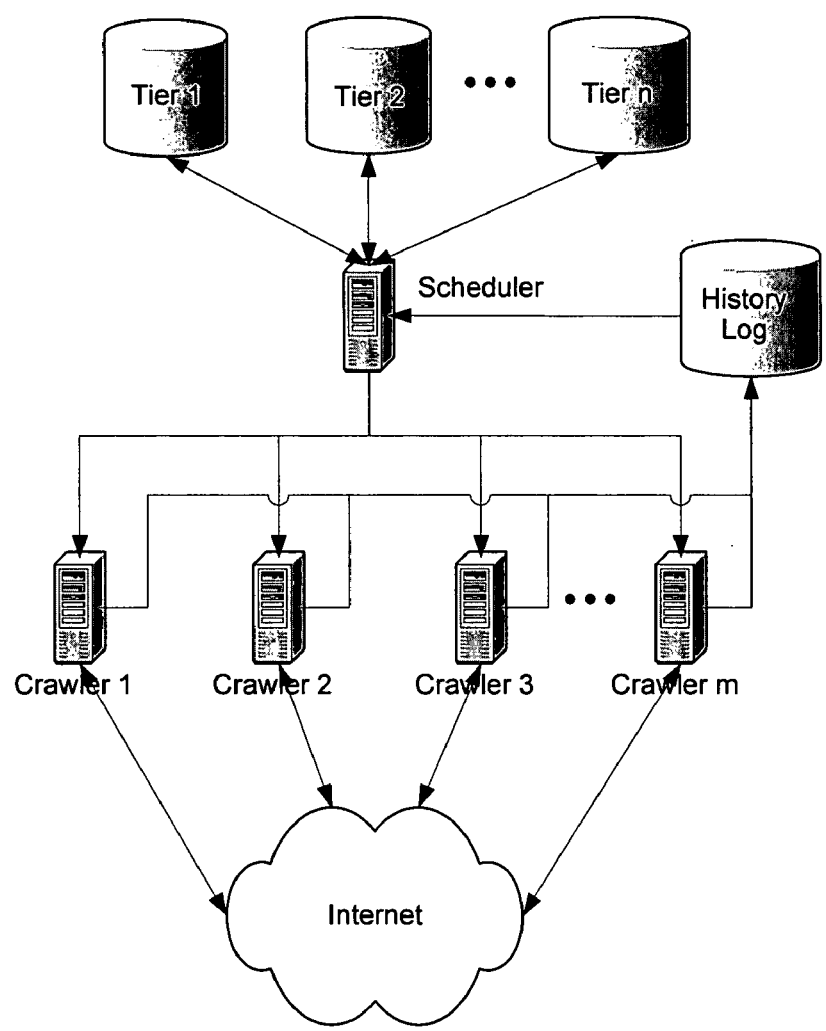
FIG. 2 depicts a search engine system that implements a multi-tier data structure for the billions of documents on the Internet.

FIG. 2 depicts a search engine system 200 that implements the multi-tier data structure as suggested above. Information for the documents falling into "Tier A" is stored in a database "Tier 1" and so on. Each document is characterized by a set of parameters including, e.g., a URL, a content fingerprint, a Boolean value suggesting whether there is a critical content change to the document, an actual web crawl interval identified by the search engine during previous web crawl(s) and a web crawl interval recommended for the forthcoming web crawl(s). The parameters could also include a past history of the N previous actual web crawl intervals. This might include information indicating for which intervals the content had changed and for which intervals the content had not changed. Using these values, it would be possible to determine an average interval length over which the document's content had not changed and an average interval length over which the document's content had changed. In other embodiment, a running average of the X previous actual web crawl intervals could be used or stored. In other embodiments, the set of parameters characterizing a document may be a subset of those identified above, or may include a subset of the parameters identified above plus other parameters not identified above.

The multi-tier databases implementing the multi-tier data structure submit web crawl requests to a scheduler, suggesting which documents should be crawled according to their respective web crawl intervals. In response, the scheduler examines the workload and capacity of its multiple web crawlers and then dispatches a particular web crawler, e.g., Crawler 3, to a web server on the Internet hosting the document.

After retrieving a new copy of the document from the hosting web server, the web crawler passes the new copy to a history log database. The history log database also has access to the previous copy of the document stored in the search engine system. Upon receipt of the new copy, the history log database retrieves the previous copy and submits both copies to the scheduler. The scheduler determines whether to modify the document's web crawl interval using information it has gathered about the document and updates one of the multi-tier databases accordingly. Of course, if this is the first time that a document has been crawled, the search engine will not have a previous copy to provide the scheduler. In this case, the scheduler assigns an initial web crawl interval to the document. The initial crawl interval could be determined in any of a number of ways, some of which are described below.

Figure 3:
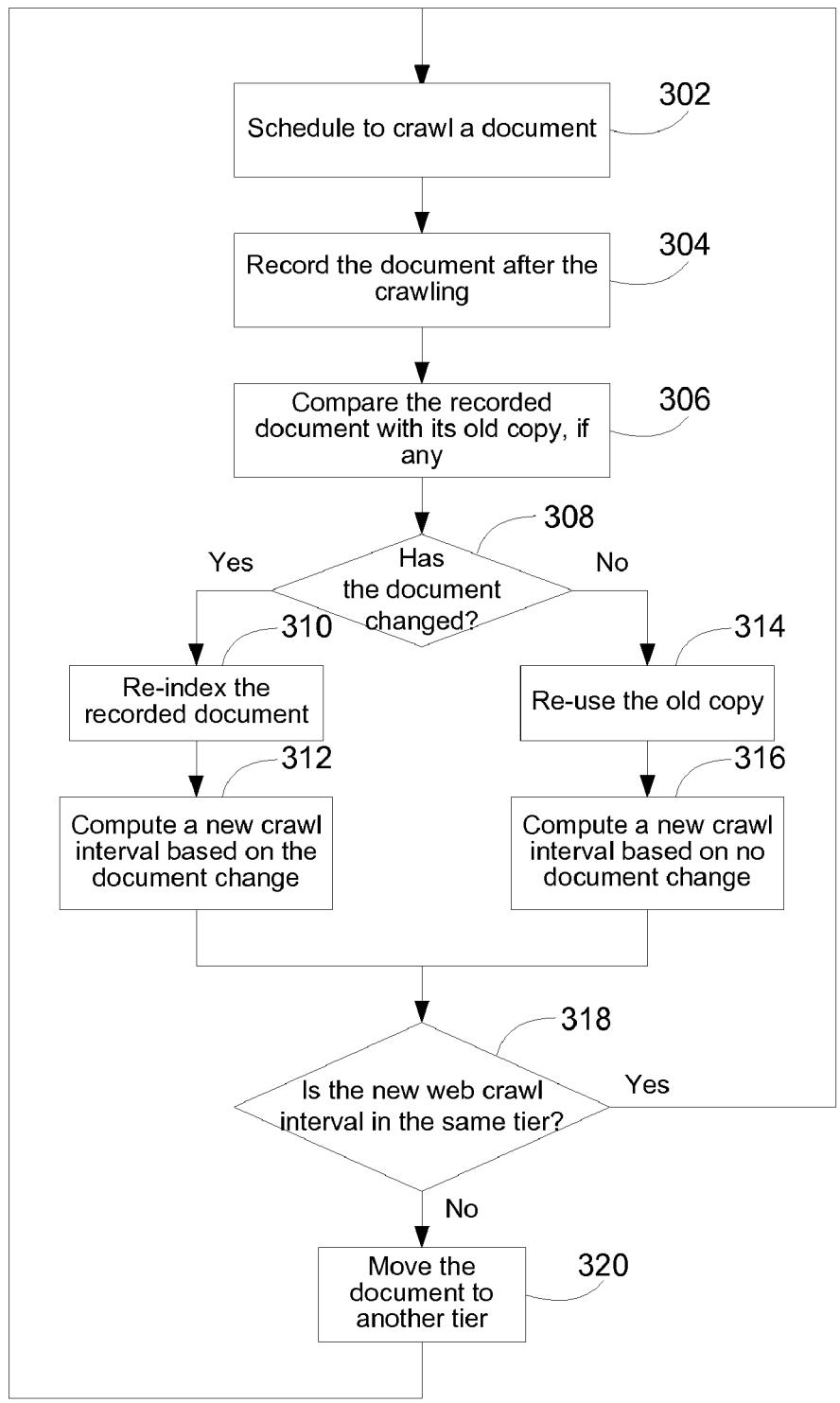
FIG. 3 is a flowchart illustrating a dynamic crawling priority update strategy in accordance with an embodiment.

FIG. 3 is a flowchart illustrating a dynamic web crawl interval update strategy in accordance with one embodiment of the present invention. After receiving information of a particular document from the scheduler, one of the multi-tier databases of FIG. 2 schedules a web crawl request for the document based upon a desired web crawl interval for the document (302). Subsequently, one web crawler is invoked by the request to retrieve a new copy of the document and record it in the history log database (304). The history log database then passes the newly recorded document and its previous copy, if any, to the scheduler. The scheduler compares the content of the newly recorded document and that of the previous copy (306) to determine if the document content has changed (308). In some embodiments, the determination made at 308 is whether there have been any critical content changes in the document. The scheduler may indicate whether or not such a change has been detected in the history log and associate it with the particular crawl interval.

The simplest way to determine content changes is to compare the content fingerprint of the document before and after the recent crawl. If the content fingerprints are equal, the document has not changed, otherwise it has. Changes can be described as critical or non-critical and that determination may depend on the portion of the document changed, or the context of the changes, rather than the amount of text or content changed. Sometimes a change to a document may be insubstantial, e.g., the change of advertisements associated with a document. In this case, it is more appropriate to ignore those accessory materials in a document prior to making content comparisons. In other cases, e.g., as part of a product search, not every piece of information in a document is weighted equally by a potential user. For instance, the user may care more about the unit price of the product and the availability of the product. In this case, it is more appropriate to focus on the changes associated with information that is deemed critical to a potential user rather than something that is less significant, e.g., a change in a product's color. Accordingly, the determination of criticality or materiality is a function of the use and application of the documents.

Alternatively, a document could be considered a collection of individual features which change from time to time. Changes associated with different features would be accorded different levels of importance. In this instance, a document would be considered "changed" if the combination of a set of weighted features whose values have changed exceeds a certain threshold. For example in the equation below, when C is greater than some defined value, then the document is deemed to have materially changed:

$$C = \sum_{i=0}^{n-1} weight_i * feature_i$$

where n is the number of features whose values have changed. Alternately, n may be the total number of features and the weights may be assigned non-zero values for only those features whose values have changed.

If the document has changed materially since the last crawl (308—Yes), the scheduler sends a notice to a content indexer (not shown), which replaces index entries for the prior version of the document with index entries for the current version of the document (310). Next, the scheduler computes a new web crawl interval (312) for the document based on its old interval and additional information, e.g., the document's importance (as measured by a score, such as pagerank), update rate and/or click rate. If the document's content has not been changed or if the content changes are non-critical (308—No), there is no need to re-index the document (314). However, the scheduler still computes a new web crawl interval (316) for the document based on its old one and other information, in particular, based on the fact that there was no critical content change to the document. A more in-depth discussion regarding the determination of the new web crawl interval is provided below. Of course, the scheduler could be configured to re-index the document and compute a new crawl interval on any change to the content, material or not.

Next, the scheduler records the newly determined web crawl interval at one of the multi-tier databases for later use. However, since the document's web crawl interval may be different from the one used previously, the document's affiliation with a particular tier may terminate as well. More specifically, if the recomputed crawl interval belongs to the interval range associated with a different tier (318—No), the document and its associate web crawl interval are moved to the other tier (320). Otherwise (318—Yes), the document and its new web crawl interval are recorded in the same tier database as previously. Alternately, the termination of whether to move the document to another tier, or to keep it in the current tier, may be based on the magnitude of the change in the document's web crawl interval.

When determining a new crawl interval, it is desirable to choose one which will reduce the probability that in response to a user request represented by a set of query terms, the web search engine returns the address of a document matching the request based on stale content. Stale content no longer reflects the current state of the document stored on the web server. Such a probability is a function of a user view rate on the document (which is a reflection on how frequently a page is viewed); a document update rate (which is an indication of how frequently the page is updated on the web host server); and the web crawl interval (which is an indication of the time between until the crawler obtains an updated copy of the document from its web server). This function can be expressed as:

$$\text{Probability}(Seen\_Stale\_Data) = \text{Function}(User\_View\_Rate, Document\_Update\_Rate, Web\_Crawl\_Interval).$$

In one embodiment, given a desired probability, Probability_Desired, the web crawl interval can be expressed as:

$$Web\_Crawl\_Interval = Probability\_Desired / (User\_View\_Rate * Document\_Update\_Rate).$$

In other words, the higher a user view rate and/or the document update rate, the smaller the web crawl interval must be to maintain the same relative probability (i.e., the document is crawled more frequently).

Alternatively, the user view rate can be expressed as a user impression rate, a user click rate or a combination of the two. An impression rate is the rate at which the user is presented with the document, which includes presentation of all or part of the document in a search result, whereas the user click rate represents when a user clicks on a document to have it presented. As a combination, the user impression rate would be combined with the user click rate multiplied by a weighting factor. The weighting factor allows a relationship to be created representing the relative worth of a click compared to an impression. For example, a click may be worth x impressions, where x varies from negative values to positive values.

There are different approaches for measuring the user click rate, such as using redirects from the origin application. However, the redirect approach may be unreliable due to various spam robots which may cause the click rate to be artificially inflated. The effects of such could be reduced by, for example, using unique session identification information based on IP or cookie information. Alternatively, an application such as Google's NavClient could be used, which is more resistant to spam attacks than the direct approach.

It would be desirable to accurately estimate an update rate of a particular document to be crawled. Every document on the Internet has an associated document update rate and, as mentioned earlier, some documents are updated more frequently than others. If an estimated document update rate used to determine how frequently a document is crawled is much higher than the actual document update rate, then a too small web crawl interval will be determined. Therefore, a later crawl of the document at that smaller interval is likely to retrieve a copy of the document content that is substantially or materially the same as the previous crawl(s). This unnecessary crawl wastes valuable resources of the search engine. On the other hand, an estimated document update rate that is much lower than the actual document update rate results in a longer than necessary web crawl interval. This may cause the search engine to match a user query to stale data of a document because the search engine has not indexed the current version of the document.

A highly desirable situation would be that the search engine crawls a document right after its update. However, this would require that a web server notify the web search engine every time it updates a document. A more practical approach is to crawl the document at a rate that is close to its "actual" update rate.

As described in reference to FIG. 3 above, a dynamic process to approach the near-"actual" update rate of a document, would include the following steps:
1. Crawling a URL to fetch a new copy of the document's content; and
2. Comparing the new content with an old content of the document to determine if the content has changed, and if so, to what extent.

There are two possible outcomes from the comparison:
1. There is no change (or at least no material change) to the document during the web crawl interval; and
2. There is a content change (or at least a material change) to the document during the web crawl interval.

In the first case, the newly completed crawl does not retrieve any new information about the document and to a certain degree, it is a waste of the search engine's limited crawling resources. In the second case, the newly completed crawl does acquire new information about the document. In this sense, such a crawl is not a waste. However, it indicates that there must be a delay between the time when the document was updated and the time when the document was crawled even though the extent of such delay is unknown. Without knowledge of the exact update time of a document, a desirable web crawl interval for the document is the one that, when applied, alternates between the two possible outcomes.

If there are two consecutive no-change outcomes, the web crawl interval is deemed too small and at least one of the two crawls could have been avoided to save crawling resources. Accordingly, the desirable web crawl interval should be increased. If there are two consecutive change outcomes, the web crawl interval is deemed too large and the risk that a document is "seen stale" has increased. Accordingly, the desirable web crawl interval should be decreased. A number of methodologies can be envisioned for producing these type of modifications to the web crawl rate. For example, the Nyquist sampling law familiar to those involved with signal processing could be applied. According to the Nyquist sampling law, a signal having a period T should be sampled at least twice during each period in order to avoid information loss. In the case of web crawling, a document that is updated every N seconds should be sampled twice during each N seconds. In other words, a desirable web crawl interval would be N/2 seconds. The determination of a desirable web crawl interval is further made more difficult by the fact that a particular document's update rate may vary in time. As a consequence, the desired web crawl interval may vary over time.

In one embodiment, a dynamic desirable web crawl interval is determined as follows. Given that a web crawl interval is $T_1$, if the document crawled at interval $T+T_1$ shows that the document has been changed, then the web crawl interval is modified to be half of the previous interval, i.e., $T_1/2$. If there is no change to the document after the web crawl interval is halved, the desirable web crawl interval is modified to be somewhere between $T_1/2$ and $T_1$, e.g., the average of the two intervals, $3T_1/4$. An iterative process can be used to refine the desired web crawl interval. Different embodiments may select the initial web crawl interval in different ways. For example, the initial web crawl interval could be determined to be the average actual or average desired change interval for all documents, for all documents determined to be in a similar tier, or documents having a similarity to the document under consideration. In other embodiments, the initial web crawl interval could be based, at least in part, on a document's popularity or importance (e.g., as measured by the document's pagerank). For example, two documents in the same tier, but with different pageranks, may be assigned different initial web crawl intervals in accordance with their respective pageranks.

The term "pagerank" is used in this document mean a document importance score. PageRank is just one example of a document importance score. A detailed description of the PageRank algorithm can be found in the article "The Anatomy of a Large-Scale Hypertextual Search Engine" by S. Brin and L. Page, 7th International World Wide Web Conference, Brisbane, Australia and U.S. Pat. No. 6,285,999, both of which are hereby incorporated by reference as background information.

In another embodiment, an average interval between changes is compared to an average interval between no changes. If the average interval between crawls where no change was detected is greater than the average interval between crawls where a change was detected, the crawl interval may be close to the desired crawl interval. The interval could be maintained, or could be modified in accordance with the last comparison of the document with its prior version. For example, if the last comparison detected a change, then the web crawl interval may be changed to be the average interval between crawls where change was detected. On the other hand, if the last comparison detected no change, then the web crawl interval may be changed to be the average interval between crawls where no change was detected.

If the average interval between crawls where no change was detected is less than the average interval between crawls where a change was detected, it suggests that the desired crawl interval is between the two averages. Accordingly, the new web crawl interval may be chosen to be the average of the two averages.

The desired web crawl interval can be combined with other information to provide a score used to determine the crawling order for the documents to be crawled by a web search engine. The score takes into account various inputs to create a web crawl priority in order to reduce the probability of stale content to a desired level. For example, a document with a higher web crawl priority would receive more frequent visits from the search engine's web crawlers, resulting in a higher likelihood that the content is not stale.

In reality there are a huge number of documents competing for the limited web crawl capacity of a search engine. Therefore, it is practically inevitable that some documents will have stale content and will be presented to a user in a search result. The search engine can consider each document's pagerank, user click rate, and content update rates and/or other information, and provide an appropriate web crawl priority to the document so that the resultant probability of a document being seen "dirty", i.e., the document's stale content being used in response to a search query, is below an acceptable level. In other words, a document's web crawl priority will determine its web crawl order relative to other documents competing for a search engine's limited web crawl capacity.

It should be noted that a document's desired web crawl interval is not necessarily identical to the document's actual web crawl interval. For example, the priority given to a certain document may not allow it to be crawled at the desired interval. Or, if documents are grouped in tiers, that too may affect the actual crawl interval. As a result, a document's actual web crawl interval may be longer than the desired web crawl interval. However, the difference between the two web crawl intervals does not adversely affect the role played by the desired web crawl interval in a significant way. Generally, the shorter the web crawl interval of a document, the higher its web crawl priority.

A generic relationship between the probability of a document being seen stale and its pagerank, user click rate, content update rate and web crawl interval can be expressed as:

$$P_{stale} = f(PR_{pagerank}, T_{click\_rate}, T_{content\_update\_rate}, T_{web\_crawl}).$$

where $P_{stale}$ represents a probability that the document is searched, or seen, in its stale state; $PR_{pagerank}$ represents the pagerank or importance of the document; $T_{click\ rate}$ represents the rate at which users click on the document; $T_{content\ update\ rate}$ represents the rate at which the document is updated by its web server; and $T_{web\ crawl}$ represents the desired web crawl interval. The exact mathematical expression of the function $f$ is relatively arbitrary depending on how much weight each of the four parameters is allocated by the search engine in determining the probability. However, there is a set of qualitative features characterizing this relationship shared by any particular mathematical expression. For example, if the pagerank, the content update rate and the desired web crawl interval of a document are treated as fixed quantities, an increase in the user click rate will result in a higher probability of the document being seen, or searched, as stale from the search engine. Similarly, an increase in a document's content update rate, while holding fixed the other parameters, will increase the probability of stale content from the document being seen. An increase in the web crawl interval, while holding fixed the other parameters, will also increase the probability of stale content from the document being seen.

The impact of a document's pagerank on its probability of being seen stale is similar to that of the user click rate. A document's pagerank is often correlated with its user click rate, because the pagerank is indicative of the document's popularity or importance. The more popular a document is, the more visits it receives per unit of time period.

In one embodiment, the $P_{stale}$ score is used to order the crawl of documents. In this embodiment, documents are crawled in decreasing order of the probability that they will be seen in their stale state.

As noted above, a document may be thought of as a collection of features which may be individually updated from time to time. As such, each feature may or may not be modified from the previous crawl. Each feature could have a feature change interval associated with it measured and stored as discussed above. The feature change intervals can be used to construct a document change interval where each feature is given a different weight depending on its desired importance, or other factors. For example, the document change interval could be determined by:

$$\text{document\_interval} = \sum_{i=0}^{n-1} \text{weight}_i * \text{feature\_interval}_i$$

where n is the number of features. This change interval could then be used as described above in determining the desired web crawl interval.

Figure 4:
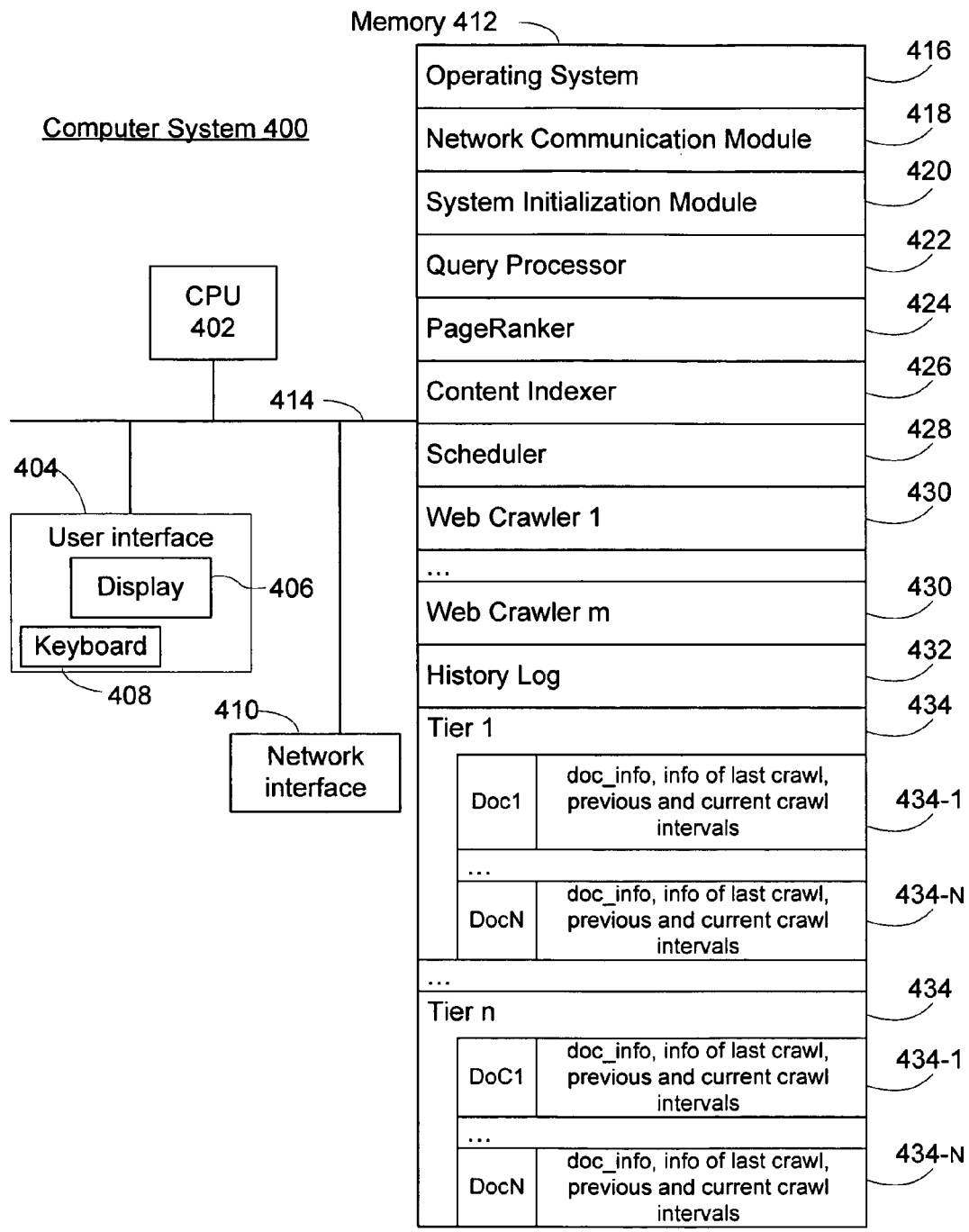
FIG. 4 illustrates a computer-based search engine system in accordance with an embodiment.

FIG. 4 illustrates an embodiment of a computer-based search engine system 400 that implements the web crawl interval update strategy discussed above. The system 400 includes one or more processing units (CPU's) 402, one or more network or other communications interfaces 410, memory 412, and one or more communication buses 414 for interconnecting these components. The system 400 may optionally include a user interface 404 comprising a display device 406 and a keyboard 408. Memory 412 may include high speed random access memory and may also include non-volatile memory, such as one or more magnetic disk storage devices. Memory 412 may include mass storage that is remotely located from the CPU's 402. The memory 412 preferably stores:

- an operating system 416 that includes procedures for handling various basic system services and for performing hardware dependent tasks;
- a network communication module (or instructions) 418 for connecting the computer system 400 to other computers via the one or more communication network interfaces 410 (wired or wireless), such as the Internet, other wide area networks, local area networks, metropolitan area networks, and so on;
- a system initialization module (or instructions) 420 that initializes other modules and data structures stored in memory 412 required for the appropriate operation of the computer system 400;
- a query processor 422 for receiving and processing search queries submitted from various client computers, and then organizing and transmitting search results back to the corresponding client computers;
- a pageranker 424 for calculating a content-independent and structure-based pagerank of a document that is used for representing the document's relative popularity;
- a content indexer 426 for generating a set of inverted content indexes for a document based on its current content;
- a scheduler 428 for dispatching web crawlers in response to web crawling requests and determining a new web crawl interval for a crawled document;
- one or more web crawlers 430 for retrieving documents from various hosting web servers;
- a history log database 432 for storing previous web crawling results of each document; and
- one or more multi-tier databases 434, each database managing a certain number of documents' web crawl requests.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for scheduling documents to be crawled by a search engine in an appropriate order to reduce visibility of stale content in web searching, comprising:
    on a computer system having one or more processors and memory storing one or more programs for execution by the one or more processors:
    associating with each of a plurality of documents a respective initial web crawl interval, wherein the initial web crawl interval is determined based at least in part on a document's importance metric;
    retrieving each of the plurality of documents from a respective host at one or more times associated with each document's respective initial web crawl interval;
    associating a revised web crawl interval with a respective document of the plurality of documents based on the document's respective initial web crawl interval and any changes to content of the document;
    partitioning the plurality of documents into multiple tiers according to their respective web crawl intervals, each tier having a distinct associated range of web crawl intervals, including storing data for each tier identifying documents in the plurality of documents assigned to that tier in accordance with the documents' respective web crawl intervals;
    for each tier of the multiple tiers, determining a web crawl order for the documents assigned to the tier in accordance with their respective revised web crawl interval; and
    moving a respective document between tiers of the multiple tiers when the respective revised web crawl interval of the respective document is associated with a different tier of the multiple tiers than a previous web crawl interval of the respective document.

2. The method of claim 1, including updating the web crawl interval of a document after retrieving a new copy of the document's content from its host and detecting content changes to the document based on the new copy.

3. The method of claim 1, further comprising:
    determining for respective documents of the plurality of documents, content update rates of the respective documents, user click rates of the respective documents, and at least one document importance metric of the respective documents;
    associating the revised web crawl interval with each document of the plurality of documents based on the document's respective initial web crawl interval, any changes to content of the document, the user click rate of the document, and the at least one document importance metric of the document; and
    downloading and recording new copies of at least a subset of the documents in accordance with the determined web crawl order.

4. The method of claim 2, including updating the web crawl interval of the document to be less than the initial web crawl interval when the document's content has changed, and updating the web crawl interval to be more than the initial web crawl interval when the document's content has not changed.

5. The method of claim 2, further comprising,
identifying a first average interval between times where the document's content has not changed;
identifying a second average interval between times where the document's content has changed; and
updating the web crawl interval of the document based on the first average interval and the second average interval.

6. The method of claim 5, wherein the web crawl interval is not updated if the first average interval is greater than the second average interval.

7. The method of claim 5, wherein the web crawl interval is updated in accordance with the first average interval if the first average interval is greater than the second average interval and the document's content has not changed, and is updated in accordance with the second average interval if the document's content has changed.

8. The method of claim 5, wherein the web crawl interval is updated in accordance with an average between the first average interval and the second average interval if the first average interval is less than the second average interval.

9. The method of claim 2, wherein the computer system considers critical content changes to the document and ignores all non-critical content changes to the document when updating the document's web crawl interval.

10. The method of claim 1, wherein the initial web crawl interval of a document assigned to a respective tier is determined based at least in part on an average web crawl interval of all other documents assigned to the respective tier.

11. The method of claim 1, wherein the initial web crawl interval of the document is determined in accordance with a score corresponding to the document's popularity.

12. The method of claim 1, wherein the revised web crawl interval of a document is smaller than the document's content update interval and larger than half of the document's content update interval.

13. The method of claim 12, wherein the search engine dynamically adjusts the revised web crawl interval of the document after a respective web crawler retrieves a new copy of the document's content.

14. The method of claim 1, wherein the revised web crawl interval of a document is a time interval such that the search engine, on average, retrieves each unique version of document content at least twice according to the revised web crawl interval.

15. The method of claim 1, wherein the revised web crawl interval of a document is determined in accordance with the document's user click interval when the document's user click rate is larger than the document's content update rate.

16. A search engine system, for scheduling documents to be crawled by a search engine in an appropriate order to reduce visibility of stale content in web searching, comprising:
one or more central processing units for executing programs;
memory storing a web crawl order scheduler to be executed by the one or more central processing units;
the web crawl order scheduler comprising:
instructions for associating with each of a plurality of documents a respective initial web crawl interval, wherein the initial web crawl interval is determined based at least in part on a document's importance metric;
instructions for retrieving each of the plurality of documents from a respective host at one or more times associated with each document's respective initial web crawl interval;
instructions for associating a revised web crawl interval with a respective document of the plurality of documents based on the document's respective initial web crawl interval and any changes to content of the document;
instructions for partitioning the plurality of documents into multiple tiers according to their respective web crawl intervals, each tier having a distinct associated range of web crawl intervals, including instructions for storing data for each tier identifying documents in the plurality of documents assigned to that tier in accordance with their respective web crawl intervals;
instructions for determining, for each tier of the multiple tiers, a web crawl order for the documents assigned to the tier in accordance with their respective revised web crawl intervals; and
instructions for moving a respective document between tiers of the multiple tiers when the respective revised web crawl interval of the respective document is associated with a different tier of the multiple tiers than a previous web crawl interval of the respective document.

17. The system of claim 16, wherein the search engine system's web crawl order scheduler further comprises:
instructions for determining for respective documents of the plurality of documents, content update rates of the respective documents, user click rates of the respective documents, and at least one document importance metric of the respective documents;
instructions for associating the revised web crawl interval with each document of the plurality of documents based on the document's respective initial web crawl interval, any changes to content of the document, the user click rate of the document, and the at least one document importance metric of the document; and
instructions for downloading and recording new copies of at least a subset of the documents in accordance with the determined web crawl order.

18. The system of claim 16, wherein the changes to the content of a document comprise critical content changes and non-critical content changes, and the search engine system considers the critical content changes to the document and ignores the non-critical content changes to the document when associating a revised web crawl interval with the document.

19. The system of claim 16, wherein the revised web crawl interval of a document is smaller than the document's content update interval and larger than half of the document's content update interval.

20. The system of claim 19, wherein the search engine system dynamically adjusts the revised web crawl interval of the document after retrieving a new copy of the document's content from a respective host.

21. The system of claim 16, wherein the revised web crawl interval of a document is a time interval such that the search engine system retrieves each unique version of document content at least twice according to the revised web crawl interval.

22. The system of claim 16, wherein the revised web crawl interval of a document is determined in accordance with the document's user click interval when the document's user click interval is larger than the document's content update interval.

23. A non-transitory computer readable storage medium, for scheduling documents to be crawled by a search engine in an appropriate order to reduce visibility of stale content in web searching, storing one or more programs to be executed by a computer system, wherein the computer system includes a search engine program, the one or more programs comprising:

instructions for associating with each of a plurality of documents a respective initial web crawl interval, wherein the initial web crawl interval is determined based at least in part on a document's importance metric;

instructions for retrieving each of the plurality of documents from a respective host at one or more times associated with each document's respective initial web crawl interval;

instructions for associating a revised web crawl interval with a respective document of the plurality of documents based on the document's respective initial web crawl interval and any changes to content of the document;

instructions for partitioning the plurality of documents into multiple tiers according to their respective web crawl intervals, each tier having a distinct associated range of web crawl intervals, including instructions for storing data for each tier identifying documents in the plurality of documents assigned to that tier in accordance with their respective web crawl intervals;

instructions for determining, for each tier of the multiple tiers, a web crawl order for the documents assigned to the tier in accordance with their respective revised web crawl intervals; and instructions for moving a respective document between tiers of the multiple tiers when the respective revised web crawl interval of the respective document is associated with a different tier of the multiple tiers than a previous web crawl interval of the respective document.

24. The computer readable storage medium of claim 23, wherein the one or more programs further comprise:

instructions for determining for respective documents of the plurality of documents, content update rates of the respective documents, user click rates of the respective documents, and at least one document importance metric of the respective documents;

instructions for associating the revised web crawl interval with each document of the plurality of documents based on the document's respective initial web crawl interval, any changes to content of the document, the user click rate of the document, and the at least one document importance metric of the document; and instructions for downloading and recording new copies of at least a subset of the documents in accordance with the determined web crawl order.

25. The computer readable storage medium of claim 23, wherein the changes to the content of a document comprise critical content changes and non-critical content changes, and the search engine program considers the critical content changes to the document and ignores the non-critical content changes to the document when associating a revised web crawl interval with the document.

26. The computer readable storage medium of claim 23, wherein the revised web crawl interval of a document is smaller than the document's content update interval and larger than half of the document's content update interval.

27. The computer readable storage medium of claim 23, wherein the one or more programs dynamically adjust the revised web crawl interval of the document after retrieving a new copy of the document's content from a respective host.

28. The computer readable storage medium of claim 23, wherein the revised web crawl interval of a document is a time interval such that the search engine program retrieves each unique version of document content at least twice according to the revised web crawl interval.

29. The computer readable storage medium of claim 23, wherein the revised web crawl interval of a document is determined in accordance with the document's user click interval when the document's user click interval is larger than the document's content update interval.

30. The method of claim 1, wherein the changes to the content of a document comprise critical content changes and non-critical content changes, and the computer system considers the critical content changes to the document and ignores the non-critical content changes to the document when associating a revised web crawl interval with the document.

31. The system of claim 16, wherein the search engine system's web crawl order scheduler further comprises:

instructions for-updating the web crawl interval of a document after retrieving a new copy of the document's content from its host and detecting content changes to the document based on the new copy.

32. The system of claim 31, including instructions for updating the web crawl interval of the document to be less than the initial web crawl interval when the document's content has changed, and updating the web crawl interval to be more than the initial web crawl interval when the document's content has not changed.

33. The system of claim 31, wherein the search engine system's web crawl order scheduler further comprises:

instructions for identifying a first average interval between times where the document's content has not changed;

instructions for identifying a second average interval between times where the document's content has changed; and instructions for updating the web crawl interval of the document based on the first average interval and the second average interval.

34. The system of claim 31, wherein the web crawl interval is not updated if the first average interval is greater than the second average interval.

35. The system of claim 31, wherein the web crawl interval is updated in accordance with the first average interval if the first average interval is greater than the second average interval and the document's content has not changed, and is updated in accordance with the second average interval if the document's content has changed.

36. The system of claim 31, wherein the web crawl interval is updated in accordance with an average between the first average interval and the second average interval if the first average interval is less than the second average interval.

37. The system of claim 31, wherein the search engine system considers critical content changes to the document and ignores all non-critical content changes to the document when updating the document's web crawl interval.

38. The system of claim 16, wherein the initial web crawl interval of a document assigned to a respective tier is determined based at least in part on an average web crawl interval of all other documents assigned to the respective tier.

39. The system of claim 16, wherein the initial web crawl interval of the document is determined in accordance with a score corresponding to the document's popularity.

40. The computer readable storage medium of claim 23, wherein the one or more programs further comprise:

instructions for-updating the web crawl interval of a document after retrieving a new copy of the document's content from its host and detecting content changes to the document based on the new copy.

41. The computer readable storage medium of claim 40, including instructions for updating the web crawl interval of the document to be less than the initial web crawl interval when the document's content has changed, and updating the web crawl interval to be more than the initial web crawl interval when the document's content has not changed.

42. The computer readable storage medium of claim 40, wherein the one or more programs further comprise:
- instructions for identifying a first average interval between times where the document's content has not changed;
- instructions for identifying a second average interval between times where the document's content has changed; and
- instructions for updating the web crawl interval of the document based on the first average interval and the second average interval.

43. The computer readable storage medium of claim 40, wherein the web crawl interval is not updated if the first average interval is greater than the second average interval.

44. The computer readable storage medium of claim 40, wherein the web crawl interval is updated in accordance with the first average interval if the first average interval is greater than the second average interval and the document's content has not changed, and is updated in accordance with the second average interval if the document's content has changed.

45. The computer readable storage medium of claim 40, wherein the web crawl interval is updated in accordance with an average between the first average interval and the second average interval if the first average interval is less than the second average interval.

46. The computer readable storage medium of claim 40, wherein the one or more programs consider critical content changes to the document and ignore all non-critical content changes to the document when updating the document's web crawl interval.

47. The computer readable storage medium of claim 40, wherein the initial web crawl interval of a document assigned to a respective tier is determined based at least in part on an average web crawl interval of all other documents assigned to the respective tier.

48. The computer readable storage medium of claim 40, wherein the initial web crawl interval of the document is determined in accordance with a score corresponding to the document's popularity.

* * * * *